April 11, 1961 — T. A. HERBERT, JR — 2,979,005
APPARATUS FOR MAKING CURVED SANDWICH PANELS
Filed Jan. 13, 1956 — 5 Sheets-Sheet 1

INVENTOR.
T.A. HERBERT JR.
BY George Still
AGENT

INVENTOR.
T.A. HERBERT JR.
BY George Stell
AGENT

April 11, 1961 T. A. HERBERT, JR 2,979,005
APPARATUS FOR MAKING CURVED SANDWICH PANELS
Filed Jan. 13, 1956 5 Sheets-Sheet 3 fig-6 fig-11

INVENTOR.
T.A. HERBERT JR.
BY
George Stell
AGENT

United States Patent Office 2,979,005
Patented Apr. 11, 1961

2,979,005

APPARATUS FOR MAKING CURVED SANDWICH PANELS

Thomas A. Herbert, Jr., Chula Vista, Calif., assignor to Rohr Aircraft Corporation, Chula Vista, Calif., a corporation of California Filed Jan. 13, 1956, Ser. No. 558,973

10 Claims. (Cl. 113—99)

This invention relates to the construction of metallic sandwich structures wherein the ends of a metallic cellular core are brazed to the opposing faces of two spaced apart metallic skins and more particularly to an apparatus and method for making metallic sandwich structures having substantially cylindrical or semi-cylindrical shapes.

It is a primary object of this invention to provide a method and apparatus for constructing a cylindrical or semi-cylindrical metallic sandwich structure in which the skins and core are held in smoothly and accurately assembled relationship with each other during the brazing operation.

A further object is to provide a method and apparatus with which a cylindrical or semi-cylindrical sandwich structure may be made having skins free from wrinkles or other unwanted distortions.

Another object is to provide a method and apparatus in which the skins and core are pressed together in assembled relationship with an evenly distributed pressure.

A further object is to provide a method and apparatus for constructing a metallic sandwich structure in which the brazing operation takes place in a non-oxidizing atmosphere.

A still further object is to provide a method and apparatus for making a metallic sandwich structure in which the differential between the co-efficient of thermal expansion of two metals is used to apply pressure to press the skins tightly against the core during the brazing operation.

A further object is to provide a method and apparatus with which accurately shaped cylindrical and semi-cylindrical sandwich structures may be made.

Another object is to provide apparatus for the construction of sandwich structures which is of durable and inexpensive construction.

These and other objects and advantages will become apparent as the description of the invention proceeds.

For a better understanding of the invention reference is made to the accompanying drawing illustrating a preferred embodiment thereof and in which.

Figures 1, 2, 3, 4:
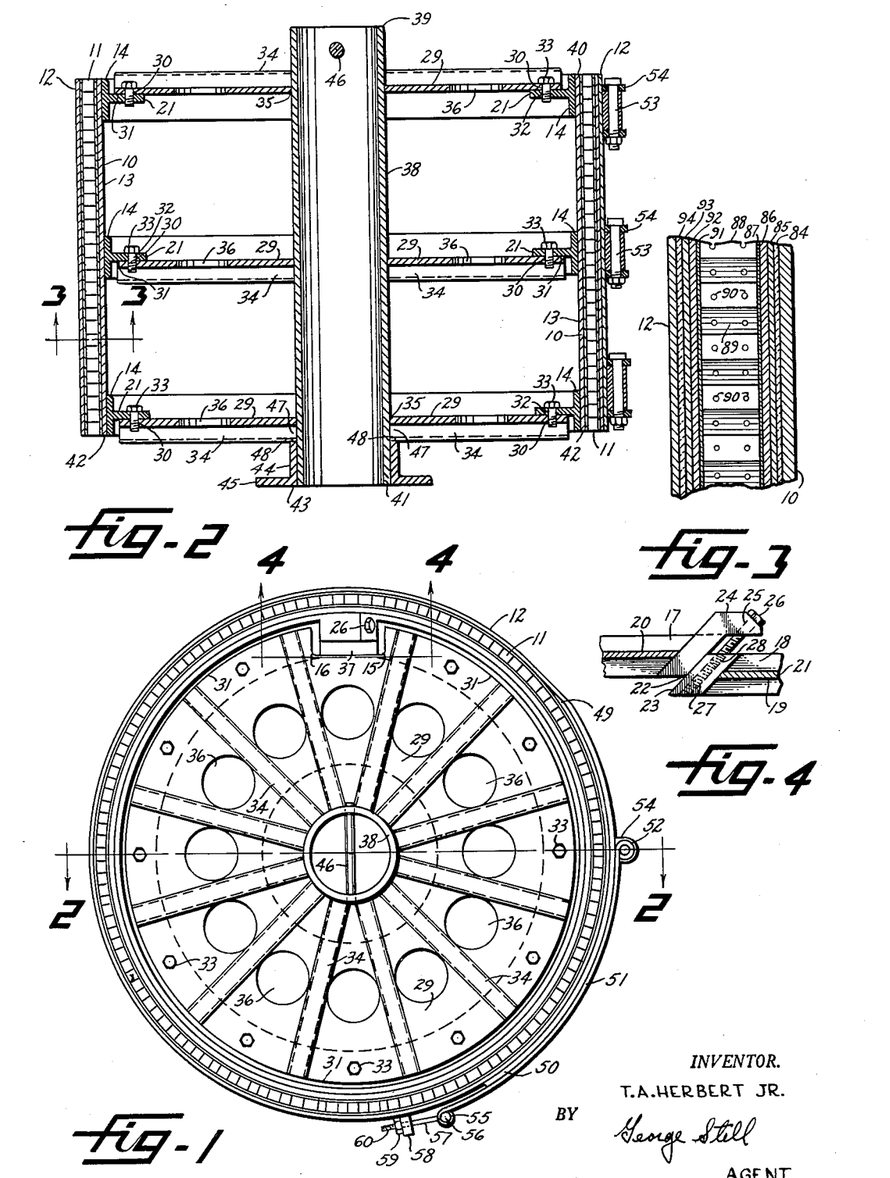
Fig. 1 is a top view of a cylindrical support on which a cylindrically shaped metallic sandwich structure is supported.
Fig. 2 is a cross sectional view of Fig. 1 taken on line 2—2.
Fig. 3 is an enlarged sectional view of Fig. 2 taken on line 3—3.
Fig. 4 is an enlarged sectional view of Fig. 1 taken on line 4—4.

With reference to Figs. 1 and 2 of the drawing wherein is shown apparatus for supporting a cylindrically shaped sandwich structure during the brazing operation which includes a tubular member 10 made of a cylindrically formed sheet of semi-rigid metal on which a cylindrically shaped sandwich structure 11 is held by means a flexible metallic blanket 12. Disposed within member 10 in spaced apart positions and in frictional engagement with the inner surface 13 of member 10 are annular metallic ribs 14 which are preferably T-shaped in section as shown. The ends 15 and 16 of ribs 14 are spaced apart and connected by connectors 17 and 18 which are positioned on the ends 19 and 20 of the projecting portion 21 of ribs 14 (see Fig. 4). Connectors 17 and 18 have abutting faces 22 and 23 inclined at an acute angle and in sliding engagement with each other and connector 17 has a projecting portion 24 provided with an opening 25 in which a bolt 26 is rotatably secured with the axis thereof parallel to faces 22 and 23. Connector 18 is provided with a threaded opening 27 in alignment with opening 25 in which the extending end 28 of bolt 26 is threadedly engaged. Rotation of bolt 26 in the proper direction to advance end 28 of bolt 26 into opening 27 draws connector 18 upwardly with face 23 thereof moving along face 22 of connector 17 to thus move ends 19 and 20 of rib 14 away from each other causing rib 14 to expand and press outwardly against surface 13 of member 10. Rotation of bolt 26 in the opposite direction forces connector 18 downwardly with face 23 thereof moving along face 22 of connector 17 to allow ends 19 and 20 of rib 14 to move toward each other and reduce the force with which rib 14 presses against surface 13 of member 10.

A reinforcing web 29 having a series of spaced apart bolt holes 30 along its edge 31 which, when ribs 14 are expanded are in alignment with similarly spaced bolt holes 32 in extending portion 21 of rib 14, is secured to portion 21 of each of ribs 14 by means of bolts 33, to rigidly hold ribs 14 in supporting positions against the inner surface 13 of member 10. Webs 29 are made of sheet metal reinforced by rigid members 34 attached thereto and extending radially outward from a central opening 35. Webs 29 are provided with openings 36 positioned between member 34 and a recess 37 in edge 31 to accommodate connectors 17 and 18. A rigid hollow column 38 extends through central opening 35 in webs 29 with the upper end 39 thereof extending out past the upper end 40 of member 10 and the lower end 41 thereof extending out past the lower end 42 of member 10. Lower end 41 of column 38 is provided with a base 43 having a body portion 44 surrounding end 41 and an outwardly extending portion 45, and upper end 39 of column 38 is provided with a lifting pin 46 positioned therein. The walls of openings 35 are in sliding engagement with column 38 and the inner ends 47 of rigid members 34 attached to web 29 positioned at lower end 42 of member 10 engage the upper end 48 of base 43 so that the entire structure is supported and held upright on column 38.

Tubular member 10, ribs 14, webs 29 and column 38 are all made of a metal having a high coefficient of thermal expansion and are preferably made of a stainless steel alloy known commercially as type 316 consisting of: Chromium 16 to 18%, nickel 10 to 14%, molybdenum 2 to 3%, manganese 2%, silicon 1% and the balance iron and minor impurities. This alloy has a coefficient of thermal expansion of $10.6 \times 10^{-6}$ per degree Fahrenheit.

Flexible blanket 12 with which sandwich structure 11 is held in assembled relationship on tubular member 10 is made of relatively thin flexible sheet metal and is sufficiently long to encompass structure 11 with its ends 49 and 50 overlapping for a considerable distance. End 49 of blanket 12 is tapered as shown in Fig. 1 of the drawing so that end 50 passes smoothly thereover permitting blanket 12 to remain in full contact with structure 11. Blanket 12 is provided with a series of spaced apart curved connecting links 51 each of which has one end 52 pivotally connected to a bolt 53 which passes through a bracket 54 attached to the overlapping end 50. The opposite end 55 of each of links 51 is attached to the end 56 of a threaded bolt 57 which extends through an annular projection 58 attached to blanket 12 near end 50. A threaded nut 59 is threadedly engaged with the extending end 60 of bolt 57 so that by rotating nut 59 link 51 and end 50 of blanket 12 may be drawn toward projection 58 thereby drawing blanket 12 snugly against structure 11 and pressing the structure against member 10. Blanket 12 is made of a metal having a low coefficient of thermal expansion and is preferably made of a stainless steel alloy known commercially as type 410 consisting of: Chromium 11.5 to 13.5%, nickel 0.5% maximum, manganese 1% maximum, silicone 1% maximum and the balance iron and minor impurities. This alloy has a coefficient of thermal expansion of $6.4 \times 10^{-6}$.

Figures 5, 7:
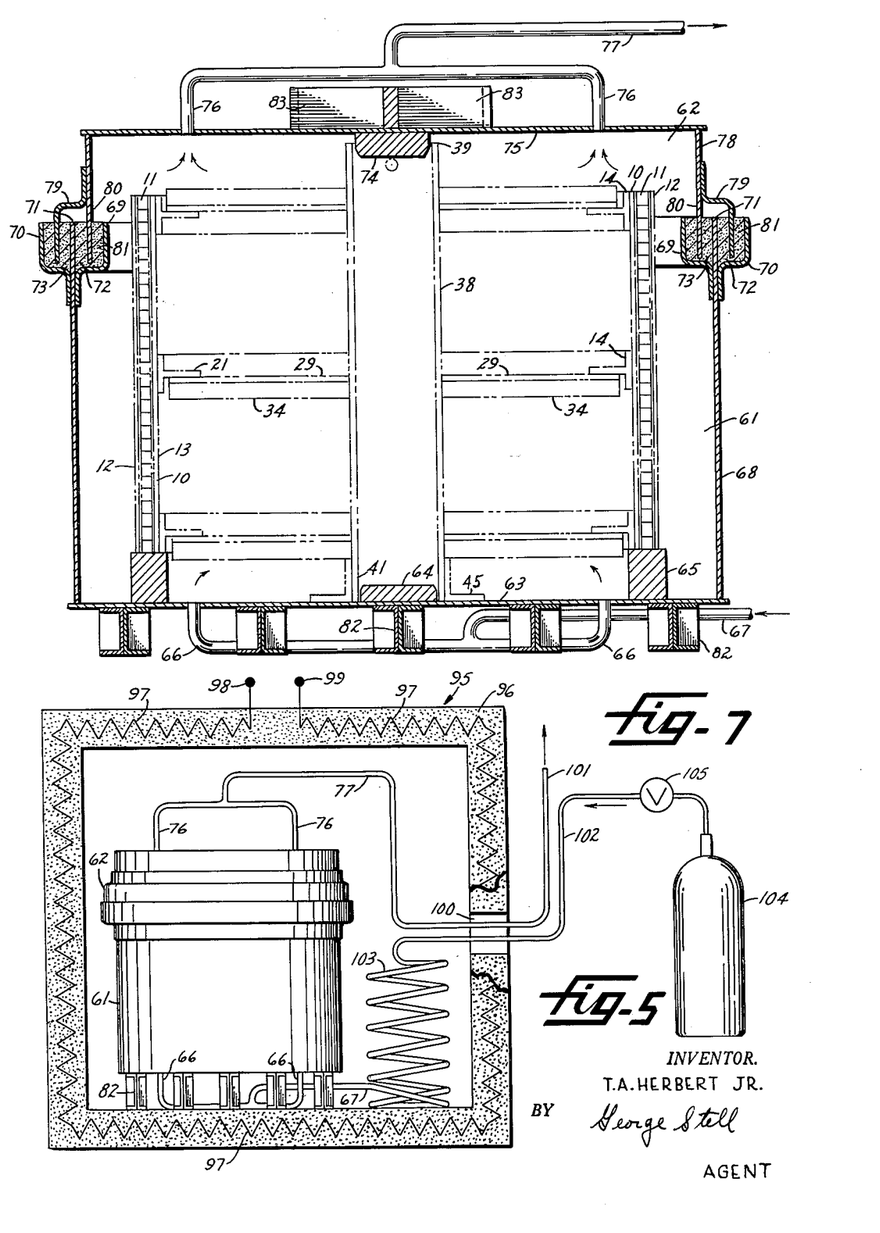
Fig. 5 is a schematic view of a furnace and a container in which the support is placed during the brazing operation together with a source of inert gas for providing a non-oxidizing atmosphere.
Fig. 7 is a cross sectional view of Fig. 6 taken on line 7—7.
Figure 6:
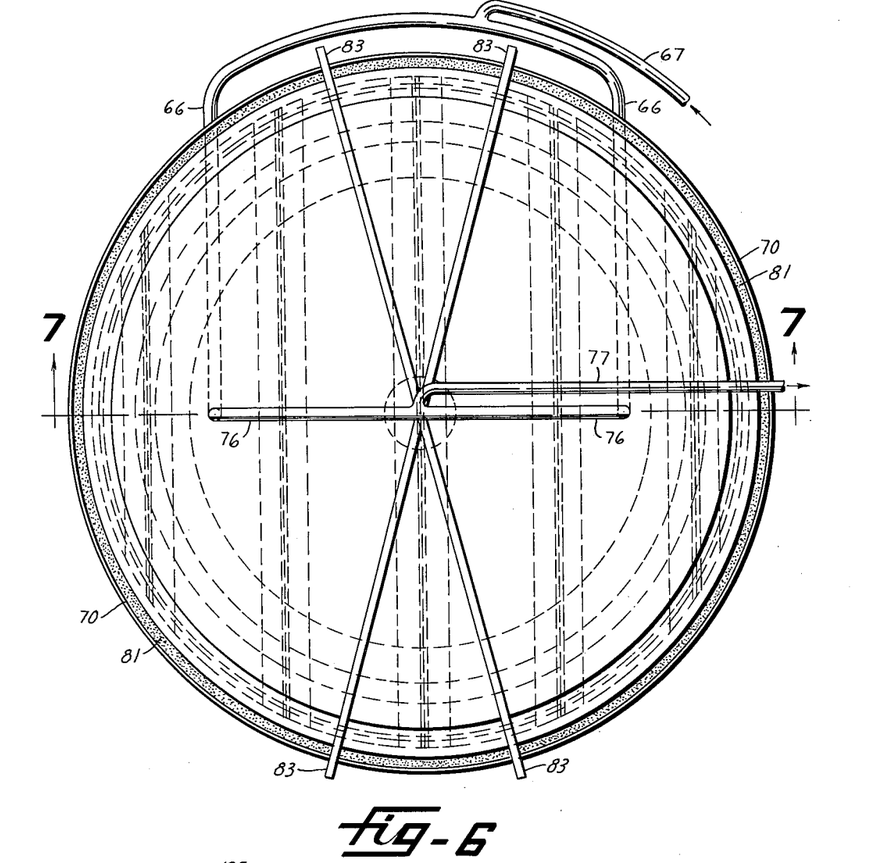
Fig. 6 is a top view of the container shown in Fig. 5.

To provide a non-oxidizing atmosphere in which to perform the brazing operation the entire supporting apparatus and sandwich structure is placed within a cylindrical container 61 having a cover 62. The bottom 63 of container 61 is provided with a centrally positioned locating plug 64 arranged to engage and fit within the lower end 41 of column 38 and an annular support 65 surrounding plug 64 is arranged to engage the lower ends of sandwich structure 11, tubular member 10 and blanket 12. A pair of inlet tubes 66 extend through bottom 63 and are connected to a tube 67 for a purpose to be explained. The side wall 68 of container 61 is provided with upwardly projecting flanges 69 and 70 secured to the inner and outer surfaces thereof adjacent its upper end 71 forming a pair of annular channels 72 and 73 at end 71. Cover 62 has a centrally positioned locating plug 74 attached to the upper wall 75 thereof which is arranged to engage and fit within the upper end 39 of column 38. A pair of outlet tubes 76 extend through wall 75 of cover 62 and are connected to a tube 77 for a purpose to be explained. The side wall 78 of cover 62 has an outwardly and downwardly projecting flange 79 secured to the outer surface thereof adjacent its end 80. Flange 79 and end 80 are spaced so that when cover 62 is placed on container 61 flange 79 is positioned in channel 72 and end 80 is placed in channel 73 to support cover 62. Channels 72 and 73 are filled with sand shown at 81 surrounding end 80 and flange 70 to provide a seal against leakage of gas therethrough. Container 61 is supported on rails 82 and cover 62 is provided with bars 83 attached thereto as lifting handles.

To use the above described apparatus for holding a sandwich structure in assembled relationship during the brazing operation, webs 29 are disconnected from ribs 14 by removal of bolts 33 and connectors 17 and 18 are adjusted in the manner previously described to permit ends 15 and 16 of ribs 14 to move inwardly toward each other allowing ribs 14 to contract and move away from surface 13 of tubular member 10. Connectors 17 and 18 are removed from ends 19 and 20 of portion 21 and ribs 14 and webs 29 are removed from within tubular member 10. Contraction and removal of ribs 14 from member 10 permits member 10 to contract so that its edges (not shown) move toward each other into slightly overlapping positions. A sheet of quartz glass cloth 84 (see Fig. 3) is then wrapped around tubular member 10, sheet 84 being of sufficient length so that its ends overlap an amount equal to the overlap of the edges of member 10. Sheet 84 is held in position on member 10 by temporary securing means such as adhesive cellulose tape. A thin flexible sheet of metal 85 is then wrapped around member 10 over sheet 84, metal sheet 85 being of sufficient length to permit the ends thereof to overlap an amount equal to the overlap of the edges of tubular member 10. Sheet 85 is also held in position around sheet 84 by temporary securing means similar to that used on sheet 84. The inner skin 86 of sandwich structure 11 is then wrapped around tubular member 10, skin 86 being of sufficient length so that its ends overlap a small amount and when its ends are joined together the resulting cylinder has a circumference of the size desired. The ends of skin 86 are connected together in overlapping positions by placing a strip of brazing alloy foil between the ends and applying sufficient heat to melt the brazing material after which the ends are allowed to cool thus connecting the ends and holding skin 86 in position on member 10. Ribs 14 and webs 29 are then placed within member 10 around column 38 and connectors 17 and 18 placed on ends 19 and 20 of projecting portion 21 of ribs 14. Ribs 14 are positioned in tubular member 10 in spaced apart positions as shown in Fig. 2 and bolts 26 are rotated to draw connector 18 upwardly moving ends 15 and 16 of ribs 14 away from each other thus expanding ribs 14 out against inner surface 13 of member 10. The expansion of ribs 14 continues until member 10 has been expanded sufficiently to bring its edges into alignment with each other which also is sufficient to expand sheet 84 and metal sheet 85 to bring the overlapping ends thereof into alignment with each other. The expansion of member 10 as above described presses the sheet of quartz glass cloth 84 and metal skin 85 outwardly against the inner surface of skin 86 which, having its ends connected together, cannot expand so that it becomes tautly drawn around member 10 over sheets 84 and 85. Any force exerted by the expansion of ribs 14 and member 10 in excess of that required to draw skin 86 taut is prevented from injuring skin 86 by the compressibility of sheet 84 which acts as a cushion between skin 86 and tubular member 10. When ribs 14 have been expanded sufficiently webs 29 are secured to projecting portions 21 of ribs 14 by means of bolts 33 as shown in Fig. 2 with inner ends 47 of members 34 on web 29 positioned at lower end 42 of member 10 resting on upper end 48 of base 43. The outer surface of skin 86 is then covered with a thin sheet of brazing alloy 87 which is secured to skin 86 by spot soldering at spaced apart points. The brazing alloy is a known type and the thickness of the sheet may vary with the amount of brazing material deposit desired in the finished article. In brazing the ends of a cellular core made of stainless steel approximately .002 of an inch in thickness to the faces of skins made of stainless steel approximately .010 of an inch in thickness, it has been determined that a sheet of brazing alloy approximately .002 of an inch thick consisting of 85% silver and 15% magazine placed between the ends of the core and the faces of skins will provide a suitable bond between the core and skins when heated to about 1800° F. A suitable end supporting member such as a channel or Z-shaped in section bar (not shown) as is customarily used to form the edges of metallic sandwich panels and which has been formed to conform to the shape of skin 86, is placed on the brazing alloy sheet 87 along each of the ends of skin 86. The edge members are secured in position by spot brazing them at spaced intervals to skin 86. A metallic cellular core 88, preferably of the type having walls 89 provided with openings 90 is then wrapped around skin 86 over brazing alloy sheet 87. Core 88 is wrapped snugly and smoothly around skin 86 with its edges disposed in closely abutting positions and its sides in contact with the edge supporting members. The abutting edges of core 88 are connected together by brazing and core 88 is held in position by being spot brazed to skin 86 at spaced intervals. A sheet of brazing alloy 91 similar to brazing alloy sheet 87, is placed over the outer surfaces of core 88 and the edge members, sheet 91 being held in position by being spot brazed to core 88 at spaced apart intervals. The outer skin 92 of structure 11 is then wrapped around core 88 and the edge supporting members over brazing alloy sheet 91. Skin 92 is drawn smoothly and tightly around core 88 with its ends overlapping a small amount. A strip of brazing material similar to sheet 91 is placed between the overlapping ends of skin 92 and the ends spot brazed together to hold skin 92 tightly wrapped around core 88. Skin 92 is also spot brazed to the face of core 88 to hold the skin in position. A thin flexible sheet of metal 93 similar to sheet 85 is wrapped around skin 92 and secured in position thereon with temporary securing means such as adhesive cellulose tape. A sheet of quartz glass cloth 94 similar to sheet 84 is wrapped around sheet 93 and secured in position therearound with temporary securing means such as adhesive cellulose tape. Blanket 12 is then wrapped around sheet 94 and secured therearound by connecting ends 49 and 50 thereof together by means of links 51 and the blanket drawn tightly around the entire structure in the manner previously described, to press the above described assembly against tubular member 10 and hold skin 86, core 88 and skin 92 in assembled position for performing the brazing operation.

The entire supporting structure and sandwich structure are then placed in container 61 with lower end 41 of column 38 surrounding plug 64, collar 45 resting on bottom 63, and the lower ends of sandwich structure 11, tubular member 10 and blanket 12 resting on annular support 65. Cover 62 is placed on container 61 with end 80 of wall 78 and flange 79 positioned in channels 72 and 73 as previously described and plug 74 engaged within upper end 39 of column 38. The entire supporting structure and sandwich structure 11 are held in a fixed position within container 61 by engagement of plugs 74 and 64 with upper and lower ends 39 and 41 of column 38 and the weight of tubular member 10, sandwich structure 11 and blanket 12 is supported by annular support 65 to prevent a downward force being applied to webs 29 during the brazing operation.

Container 61 containing the entire supporting apparatus and sandwich structure 11 as above described is placed within a furnace 95 (see Fig. 5) having walls 96 containing an electrical heating element 97 the ends 98 and 99 of which are connected to a source of electrical current (not shown). Walls 96 of furnace 95 are provided with an opening 100 extending therethrough and through which tubes 101 and 102 pass. Tube 101 is connected to tube 77 which is connected to outlet tubes 76 in cover 62 and tube 102 is connected to tube 67 which is connected to inlet tubes 66 in bottom 63 of container 61. Tube 102 has a portion 103 formed as a helical coil disposed within furnace 95 and is connected to a source 104 of pressurized inert gas, preferably argon, through a valve 105. To perform the brazing operation valve 105 is opened to permit argon gas to flow slowly through tubes 102 and 67 and inlets 66 into container 61. The argon gas being heavier than air, forces the air within container 61, including the air in sandwich structure 11, upwardly and out through outlets 76 in cover 62 and out through tubes 77 and 101. When container 61 is completely filled with gas and all air therein has been forced out, electrical current is directed into heating element 97 to raise the temperature of the furnace atmosphere. The furnace temperature is raised to a degree at which the brazing alloy disposed between core 88 and skins 86 and 92 is melted which, when the alloy described is used, is at about 1800° F. While the furnace is heating and during the time required to heat the sandwich structure, a small amount of argon gas is permitted to flow into container 61 and the gas within the container displaced thereby is permitted to escape through outlets 76 and tubes 77 and 101. The gas admitted to container 61 is heated prior to entering the container by passing through coiled portion 103 of tube 102 disposed within furnace 95. As the temperature within container 61 rises tubular member 10, webs 29, ribs 14 and column 38, being made of metal having a high coefficient of thermal expansion, expands a substantial amount pressing skin 86, core 88 and skin 92 outwardly against blanket 12 which being made of metal having a low coefficient of thermal expansion, expands a relatively small amount. The pressure thus applied presses skins 86 and 92 and sheets of brazing alloy 87 and 91 tightly against core 88. The pressure applied in this manner is prevented from damaging skins 86 and 92 and core 88 by the cushioning effect of quartz glass cloth sheets 84 and 94 disposed on each side of the skins and core. When the temperature in furnace 95 is sufficiently high to melt the brazing alloy contained in the above described assembled structure, the flow of electrical current to element 97 is stopped and the entire apparatus and structure is allowed to cool sufficiently so that the brazing alloy may harden and bond the parts of the assembled structure together. Valve 105 is closed and tubes 101 and 102 are disconnected from tubes 77 and 67 and container 61 is removed from the furnace. Cover 62 is removed from container 61 and the entire supporting apparatus and sandwich structure supported thereon are lifted out of the container. Blanket 12 and quartz glass sheet 94 are removed from around the sandwich structure and bolts 33 removed disconnecting webs 29 from ribs 14. Connectors 17 and 18 are adjusted to permit ends 15 and 16 of ribs 14 to move toward each other and allow tubular member 10 to contract. The assembled sandwich structure 11 is then removed from tubular member 10 by being lifted upwardly over end 40 thereof. Flexible metal sheets 85 and 93 are then removed from skins 86 and 92 and the brazing operation is complete. The adhesive cellulose tape used as temporary securing means in the above described process is generally completely consumed by the heat to which the assembly is subjected during the brazing operation and the parts on which it was used are unaffected thereby.

Figure 8:
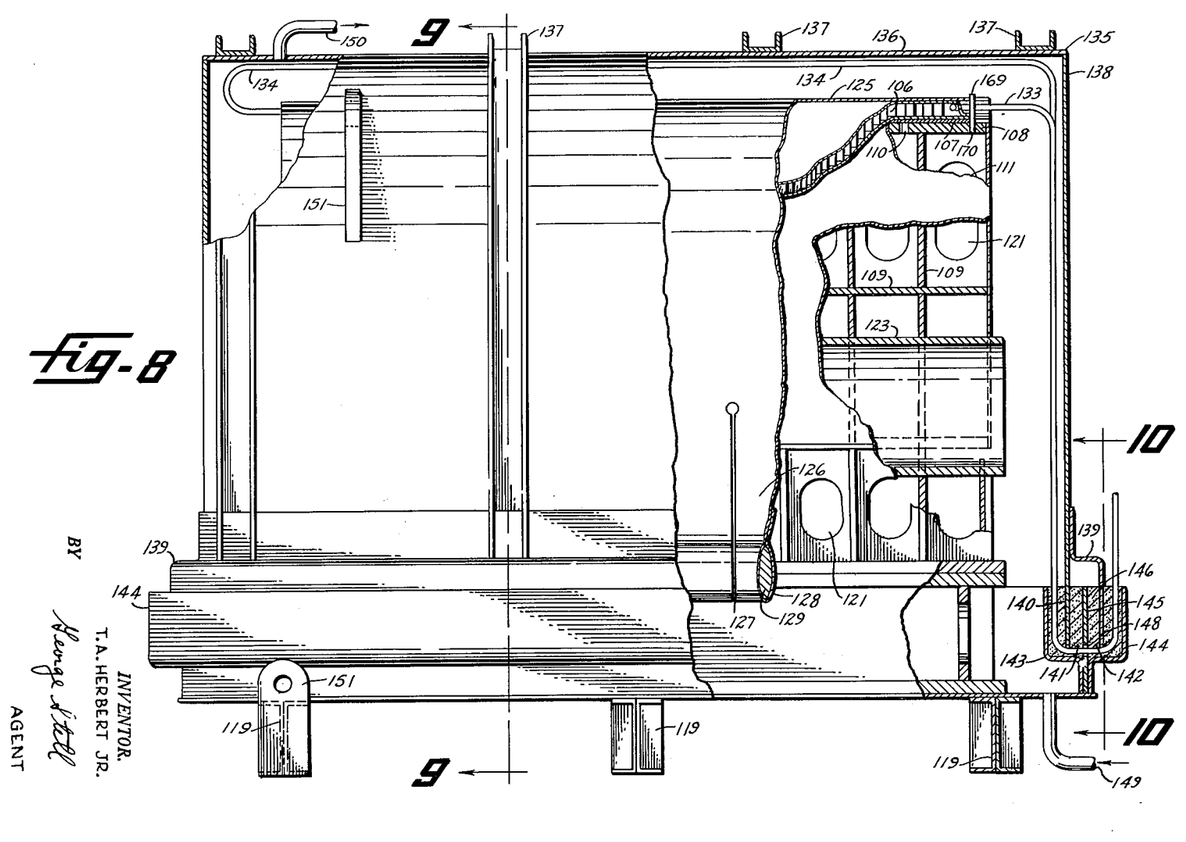
Fig. 8 is a side view of a container in which a support for a semi-cylindrical sandwich structure is placed during the brazing operation with portions cut away to show details of the construction of the container, the support and the sandwich structure.
Figures 9, 10:
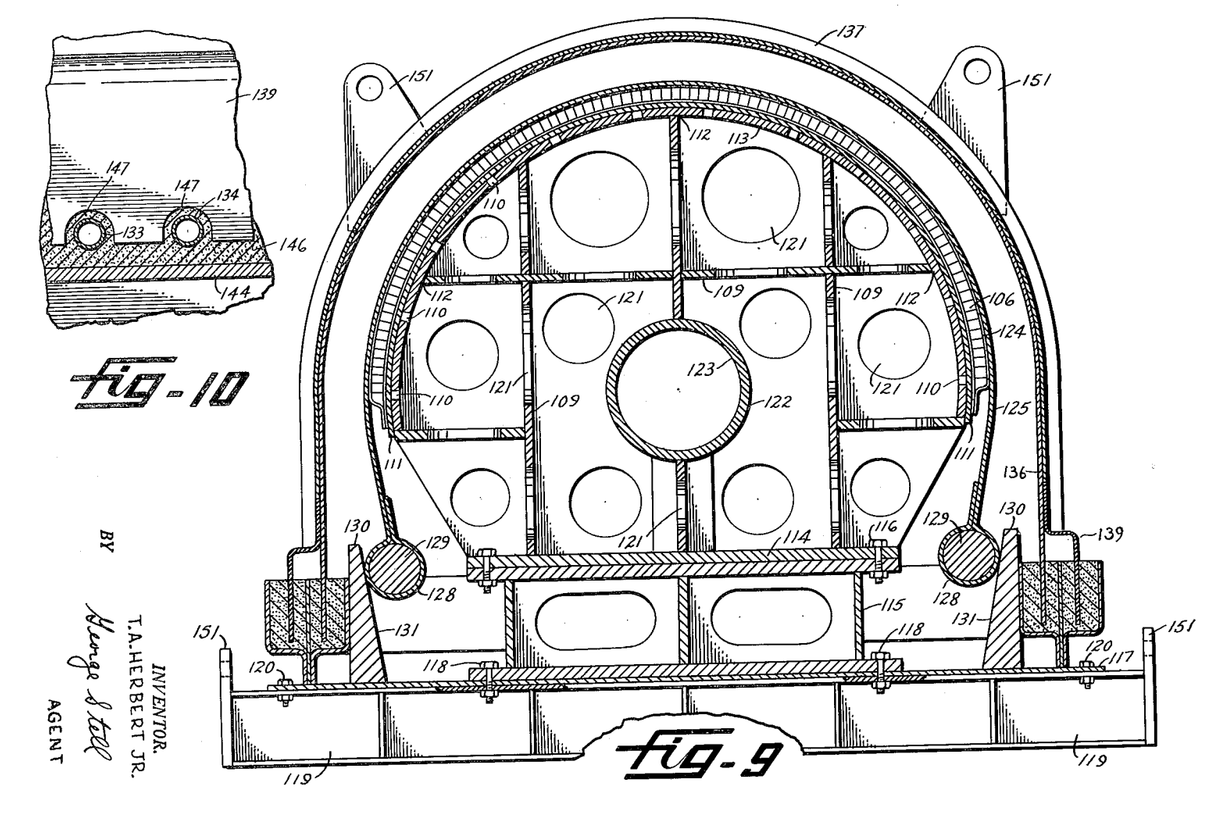
Fig. 9 is a cross sectional view of Fig. 8 taken on line 9—9.
Fig. 10 is an enlarged sectional view of Fig. 9 taken on line 10—10.

With reference to Figs. 8 and 9 of the drawing wherein apparatus is shown for supporting a semi-cylindrically shaped sandwich structure 106 during the brazing operation which includes a semi-cylindrically shaped rigid metallic shell 107 comprising an inner curved plate 108 supported by horizontally and vertically disposed interconnected webs 109. Plate 108 is provided with spaced apart openings 110 extending therethrough and is covered by a similarly shaped plate 111 on which the sandwich structure 106 is supported. Webs 109 have edges 112 shaped to engage the inner surface 113 of plate 108 and are secured to a plate 114 in a known manner such as by welding. Plate 114 is secured to a standard 115 by means of bolts 116 and standard 115 is secured to a base plate 117 by means of bolts 118. Base plate 117 is supported by a series of spaced apart rails 119 to which plate 117 is secured by bolts 120. Webs 109 are provided with spaced apart openings 121 extending therethrough and centrally aligned openings 122 through which a hollow rigid column 123 extends with the marginal walls of openings 122 secured to column 123 as by welding to provide the assembled webs with additional rigidity.

Sandwich structure 106 is held in assembled position during the brazing operation within a flexible metallic envelope 124 which is constructed in a manner and for a purpose to be explained. Envelope 124 and structure 106 are held in position against shell 107 by a flexible metallic blanket 125 of sufficient size to completely cover envelope 124. The depending ends 126 of blanket 125 are cut at intervals as indicated at 127 and the portions are formed into slings 128 into which weights 129 such as metal bars are placed to draw blanket 125 downwardly pressing envelope 124 and sandwich structure 106 against shell 107. Attached to base plate 117 and extending the length thereof are rails 130 having inclined faces 131 sloping inwardly toward each other. Slings 128 contain weights 129 are engaged by faces 131 and urged inwardly toward each other so that the force with which blanket 125 is drawn downwardly against envelope 124 and sandwich structure 106 is evenly distributed over the entire surface of structure 106.

Figure 11:
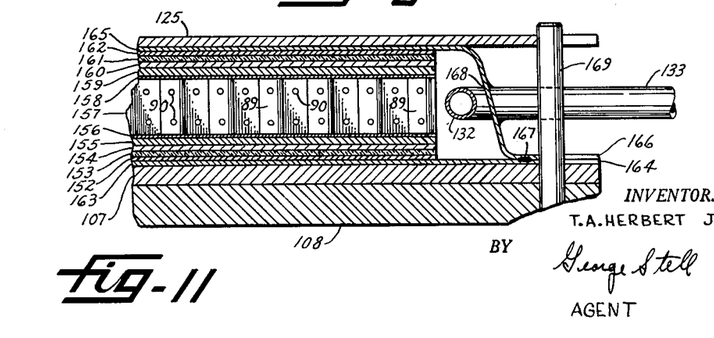
Fig. 11 is an enlarged view of the end portion of the sandwich structure shown in Fig. 8.

Envelope 124 is provided with an inlet tube 132 (see Fig. 11) extending along one end of sandwich structure 106 and connected to a tube 133 and an outlet tube (not shown) extending along the opposite end of sandwich structure 106 and connected to a tube 134 for a purpose to be explained.

The supporting apparatus and sandwich structure are covered with a metal cover 135 which rests on base plate 117 in sealing engagement therewith. Cover 135 has a curved body portion 136 provided with stiffeners 137 and end walls 138. Body 136 and ends 138 have an outwardly and downwardly projecting flange 139 secured thereto which is spaced away from and parallel to the edges 140 thereof. Base plate 117 is provided with a pair of channels 141 and 142 extending therearound arranged to receive flange 139 and edges 140 which are formed by a pair of flanges 143 and 144 similar to flange 139 and which are secured to opposite sides of an upright member 145 attached to base plate 117. Channels 141 and 142 are filled with sand as indicated at 146 to seal the channels against leakage of gas therethrough. To permit tubes 133 and 134 to extend outside of cover 135, edge 140 and flange 139 are provided with notches 147 (see Fig. 10) of sufficient size to permit the tubes to pass therethrough and upright member 145 is provided with a slot 148 (see Fig. 9) arranged to permit the tubes to pass therethrough. Tubes 133 and 134 extend downwardly into channel 141 through sand 146 and across through notches 147 and slot 148 and out through channel 142. Base plate 117 is provided with an inlet 149 opening into cover 135 and cover 135 is provided with an outlet 150 for a purpose to be explained. Cover 135 and base plate 117 are both provided with suitable lifting pads 151 to facilitate lifting and moving the apparatus.

To use the above described apparatus for holding the parts of a semicylindrically shaped sandwich structure in assembled relationship during the brazing operation the sandwich structure is first assembled in the following manner. On a metal sheet 152 (see Fig. 11) the area of which is equal to the area of sandwich structure 106, is placed a sheet of quartz glass cloth 153. On sheet 153 is placed a thin metal sheet 154 of the same size and shape as sheet 153 and on sheet 154 is placed a skin 155 of structure 106. A sheet of brazing alloy 156 similar to sheets of brazing alloy 87 and 91 previously described, is placed on skin 155. A metallic cellular core 157 similar in construction to core 88 and provided with vents 90 extending through the walls 89 thereof, is placed on brazing alloy sheet 156. A second sheet of brazing alloy 158 similar to sheet 156 is placed on core 157 on which the second skin 159 of structure 106 is placed. A thin sheet of metal 160 similar to sheet 154 is placed on skin 159 and a sheet of quartz glass cloth 161 similar to sheet 153 is placed on metal sheet 160. A metal sheet 162 similar to metal sheet 152 is placed on quartz glass sheet 161. In assembling the parts of sandwich structure 106 as above described, suitable edge supporting members such as the channel or Z shaped members previously mentioned may be placed around core 157 between sheets of brazing alloy 156 and 158 and skins 155 and 159 to provide suitable edge supporting means for sandwich structure 106. The above described assembly is placed on a thin sheet of flexible metal 163 which is of substantially greater area than sandwich structure 106 and having outwardly projecting edges 164. A thin sheet of flexible sheet metal 165 equal in size to sheet 163 is placed on the assembly with its edges 166 projecting out over edges 164 of sheet 163. Inlet tube 132 and the outlet tube (not shown) are positioned along core 157 and the extending edges 164 and 166 of sheets 163 and 165 are secured together as indicated at 167 to form envelope 124 surrounding the entire assembly. Sheet 165 is provided with suitable openings 168 through which tubes 133 and 134 pass for connection with the inlet and outlet tubes within envelope 124. Envelope 124 containing sandwich structure 106 assembled as described, is then placed on shell 107 and blanket 125 is placed thereon. To provide means for positioning envelope 124 and blanket 125 properly on shell 107 one of the edges of blanket 125 and envelope 124 are each provided with a notch (not shown) the marginal walls of which engage a locating pin 169 positioned in an opening 170 adjacent one end of shell 107, when blanket 125 and envelope 124 are properly placed on shell 107. Weights 129 are then placed in slings 128 and the slings positioned against faces 131 of rails 130 so that blanket 125 is drawn downwardly and inwardly pressing envelope 124 and the entire assembly contained therein smoothly and evenly against shell 107. Cover 135 is then placed on base plate 117 over the entire supporting apparatus in the manner previously described and the entire structure is placed in furnace 95. Tube 102 is then connected to inlet 149 in base plate 117 and tube 101 is connected to outlet 150 in cover 135. Tubes 133 and 134 are extended out through opening 100 in wall 96 and tube 133 is connected to a source of inert gas (not shown) and tube 134 is connected to an aspirator of a known type (not shown). The area surrounding the supporting apparatus between base plate 117 and cover 135 is filled with inert gas, preferably argon, in the same manner that container 61 is filled. Vacuum is applied to tube 134 to withdraw air from within envelope 124 to reduce the pressure therein to below the pressure of the surrounding atmosphere. Inert gas is then admitted into envelope 124 through tube 133 at a controlled rate which permits the pressure within envelope 124 to remain below the pressure of the surrounding atmosphere. When the area surrounding the supporting apparatus is filled with gas and the air has been entirely withdrawn from within envelope 124 and replaced with an inert gas at a pressure below the pressure of the surrounding atmosphere, electrical current is directed into heating element 97 to heat the furnace atmosphere to a temperature sufficient to melt the brazing alloy. The gas within envelope 124 provides a non-oxidizing atmosphere in which the brazing operation takes place and, being at a reduced pressure, causes sheets 163 and 165 to be pressed inwardly by the surrounding atmosphere to apply additional pressure pressing sheets of brazing alloy 156 and 158 and skins 155 and 159 inwardly against core 157 to assure a firm contact between the skins and core as the brazing alloy is melted. The inert gas surrounding the entire supporting apparatus prevents deterioration of the apparatus due to oxidation when it is subjected to the high temperatures within the furnace. When the temperature within furnace 95 is sufficiently high to melt the brazing alloy the flow of electrical current to heating element 97 is stopped and the entire structure is allowed to cool so that the brazing alloy may harden and bond the ends of core 157 to skins 155 and 159. Withdrawal of gas from envelope 124 through tube 134 and admission of gas into envelope 124 through tube 133 is stopped. The admission of gas through inlet 149 is stopped and tubes 101 and 102 disconnected from outlet 150 and inlet 149.

Tubes 133 and 134 are removed from opening 100 and the entire apparatus is removed from furnace 95. Cover 135 is removed from base plate 117 and blanket 125 is removed from around envelope 124. The envelope is then opened and sandwich structure 106 removed therefrom. The sheets of metal and quartz glass cloth previously described are removed from the structure and the brazing operation is complete.

The skins and cores used in the construction of the sandwich structures herein described are preferably made of a stainless steel alloy although other types of metal may be used. The cores are preferably made of metal approximately .002 of an inch in thickness and the skins made of sheet metal approximately .010 of an inch or less in thickness so that the parts are sufficiently flexible to be easily shaped as described.

This invention may be embodied in other forms or carried out in other ways without departing from the spirit or esesntial characteristics thereof. The present embodiment of the invention is therefore to be considered as in all respects illustrative and not restrictive, the scope of the invention being indicated by the appended claims, and all changes which come within the meaning and range of equivalency of the claims are intended to be embraced therein.

Having thus described my invention, what I claim as new and useful and desire to secure by Letters Patent is:

1. In the construction of a metallic sandwich structure wherein the open ends of a metallic cellular core are brazed to the opposed faces of inner and outer spaced apart metallic skins curved about a central axis in excess of 180° and, means for holding said skins and core in assembled relationship during the brazing operation comprising: supporting means having a curved supporting surface in excess of 180° and in contact with said inner skin and arranged to support said skins and core in assembled relationship; a flexible metallic blanket arranged to press against said outer skin and hold said skins and core firmly together in assembled relationship and against said supporting surface during the brazing operation, said blanket having depending ends, means attached to said depending ends of the blanket for drawing the same downwardly, and means for simultaneously moving said depending ends inwardly toward each other.

2. In the construction of a metallic sandwich structure of arcuate shape extending through an angle greater than 180° and less than 200 degrees about a central axis and wherein the ends of a metallic cellular core are brazed to the opposed faces of two spaced apart semi-cylindrical metallic skins, means for holding said skins and core in assembled relationship during the brazing operation comprising: an arcuate shaped metallic shell extending through an angle greater than 180° adapted to support said skins and core in assembled relationship; a plurality of spaced apart webs arranged to support said shell in a desired position; a flexible metallic blanket disposed over said skins and core; means for applying tension to the depending ends of said blanket to press said skins and core against said shell, and means for simultaneously moving said depending ends inwardly toward each other.

3. In the construction of a metallic sandwich structure of arcuate shape extending through an angle greater than 180° and less than 200 degrees about a central axis and wherein the ends of a metallic cellular core are brazed to the opposed faces of two spaced apart metallic skins, means for holding said skins and core in assembled relationship during the brazing operation comprising: a sealed envelope of flexible sheet metal adapted to contain said skins and core in assembled relationship, said envelope being provided with inlet and outlet openings; a semi-cylindrically shaped rigid metallic shell extending through an angle greater than 180° adapted to support said envelope and said skins and core in desired shape, said shell being mounted so that its axis is in a horizontal plane with the ends of its arcuate surface extending downwardly, said envelope being mounted on said shell with its ends extending substantially 180° about the arcuate surface of the shell; a plurality of spaced apart interconnected metallic webs arranged to support said shell; a flexible metallic blanket disposed over said envelope, said blanket extending below the ends of said envelope and said arcuate surface of the shell and arranged to press said skins against said core and said envelope against said shell, means for applying tension to the depending ends of said blanket to draw the same downwardly, and means for simultaneously moving said depending ends inwardly toward each other.

4. Apparatus as claimed in claim 3; in which said shell comprises an inner arcuate shaped metallic sheet provided with a plurality of spaced apart openings and an outer arcuate shaped metallic sheet disposed over said inner sheet and in contact therewith.

5. In the construction of a metallic sandwich structure of arcuate shape extending through an angle greater than 180° and less than 200 degrees about a central axis and wherein the ends of a metallic cellular core are brazed to the opposed faces of two spaced apart metallic skins, means for holding said skins and core in assembled relationship during the brazing operation comprising: a sealed envelope of flexible sheet metal adapted to contain said skins and core in assembled relationship, said envelope being provided with inlet and outlet openings; an arcuate shaped rigid metallic shell extending through an angle greater than 180° arranged to support said envelope and said skins and core, said shell being mounted so that its axis is in a horizontal plane with the ends of its arcuate surface extending downwardly, said envelope being mounted on said shell with its ends extending substantially 180° about the arcuate surface of the shell; a base plate; means attached to said base plate arranged to support said shell; a flexible metallic blanket disposed over said envelope, said blanket extending below the ends of said envelope and said arcuate surface of the shell; tensioning means attached to the depending ends of said blanket arranged to draw said blanket downwardly pressing said skins against said core and said envelope against said shell; and means for urging the depending ends of said blanket inwardly toward each other.

6. Apparatus as claimed in claim 5 in which said base plate is provided with an upwardly extending member along each side thereof arranged to engage the depending ends of said blanket and urge said ends inwardly toward each other.

7. In the construction of a metallic sandwich panel of arcuate shape extending through an angle greater than 180° and less than 200 degrees about a central axis and wherein the ends of a metallic cellular core are brazed to the opposed faces of two spaced apart metallic skins, means for holding said skins and core in assembled relationship during the brazing operation comprising: a sealed envelope of flexible sheet metal adapted to contain said skins and core in assembled relationship, said envelope being provided with inlet and outlet openings; an arcuate shaped metallic shell extending through an angle greater than 180° adapted to support said envelope and said skins and core, said shell being mounted so that its axis is in a horizontal plane with the ends of its arcuate surface extending downwardly, said envelope being mounted on said shell with its ends extending substantially 180° about the arcuate surface of the shell; a base plate; a plurality of interconnected metallic webs connected to said base plate, said webs having edges arranged to engage and support said shell; a flexible metallic blanket disposed over said envelope and in contact therewith, said blanket extending below the ends of said envelope and said arcuate surface of the shell; means connected to the depending ends of said blanket for applying tension thereto; means for urging said depending ends inwardly toward each other along paths located beneath said central axis while tension is applied thereto; and a rigid metallic cover adapted to cover said supporting means and said envelope and blanket, said cover being arranged to rest on said base plate in sealing engagement therewith.

8. Apparatus as claimed in claim 7; in which said base plate is provided with an inlet opening and said cover is provided with an outlet opening.

9. In the construction of a metallic sandwich structure having a substantially semi-cylindrical shape wherein the ends of a metallic cellular core are brazed to the opposed faces of two spaced apart substantially semi-cylindrically shaped skins having an arcuate surface in excess of 180°, means for holding said skins and core in assembled relationship during the brazing operation; comprising: a sealed envelope of flexible sheet metal adapted to contain said skins and core in assembled position, said envelope being provided with inlet and outlet openings; a semi-cylindrically shaped rigid metallic shell having an arcuate surface in excess of 180° and arranged to support said envelope and said skins and core, said shell being mounted so that its axis is in a horizontal plane with the ends of its arcuate surface extending downwardly, said envelope being mounted on said shell with its ends extending substantially 180° about the arcuate surface of the shell; a base plate; means connected to said base plate arranged to support said rigid shell; a flexible metallic blanket disposed over said envelope, said blanket extending below the ends of said envelope and said arcuate surface of the shell; tensioning means connected to the depending ends of said blanket arranged to draw said blanket downwardly against said envelope and skins; and means for simultaneously urging the ends of said blanket inwardly toward each other thereby causing said blanket to apply a substantially evenly distributed radial pressure against said envelope to press said skins and core together and against said support.

10. In the construction of a metallic sandwich structure having a substantially semi-cylindrical shape wherein the ends of a metallic cellular core are brazed to the opposing faces of a pair of spaced apart substantially semi-cylindrically shaped skins having an arcuate surface in excess of 180°, means for holding said skins and core in assembled relationship during the brazing operation, comprising: a sealed envelope of flexible sheet metal adapted to contain said skins and core in assembled position, said envelope being provided with inlet and outlet openings; a semi-cylindrically shaped rigid metallic shell having an arcuate surface in excess of 180° and arranged to support said envelope and said skins and core, said shell being mounted so that its axis is in a horizontal plane with the ends of its arcuate surface extending downwardly, said envelope being mounted on said shell with its ends extending substantially 180° about the arcuate surface of the shell; a flexible metallic blanket disposed over said envelope, said blanket having a length substantially greater than the length of said envelope, said blanket extending below the ends of said envelope and said arcuate surface of the shell; a plurality of weights connected to each of the depending ends of said blanket, said weights being arranged to draw said blanket downwardly against said envelope; and means connected to said base plate arranged and constructed to urge said weights inwardly toward each other along paths inclined at an acute angle to a vertical plane thereby drawing said blanket inwardly against the sides of said envelope causing said blanket to apply a radial pressure against said envelope to press said skins and core together against said support.

References Cited in the file of this patent

UNITED STATES PATENTS

| | | |
|---|---|---|
| 1,247,250 | Field | Nov. 20, 1917 |
| 2,093,814 | Mann | Sept. 21, 1937 |
| 2,166,998 | Morgan | July 25, 1939 |
| 2,276,847 | Kelly | Mar. 17, 1942 |
| 2,331,296 | Bendix | Oct. 12, 1943 |
| 2,337,250 | Klassen | Dec. 21, 1943 |
| 2,342,988 | Vidal | Feb. 29, 1944 |
| 2,401,299 | Galvin | June 4, 1946 |
| 2,406,051 | Weiss | Aug. 22, 1946 |
| 2,425,450 | Young | Aug. 12, 1947 |
| 2,451,783 | Sweeney | Oct. 19, 1948 |
| 2,479,325 | De Domenico | Aug. 16, 1949 |
| 2,609,068 | Pajak | Sept. 2, 1952 |
| 2,636,539 | Pajak | Apr. 28, 1953 |
| 2,654,686 | Hansen | Oct. 6, 1953 |
| 2,686,552 | Faeber et al. | Aug. 17, 1954 |
| 2,700,632 | Ackerlind | Jan. 25, 1955 |
| 2,722,735 | Beamish | Nov. 8, 1955 |
| 2,773,302 | Watson | Dec. 11, 1956 |
| 2,845,698 | Giovannucci et al. | Aug. 5, 1958 |

FOREIGN PATENTS

| | | |
|---|---|---|
| 503,520 | Canada | June 8, 1954 |
| 511,805 | Italy | Jan. 28, 1955 |